United States Patent
Schwenkel et al.

(10) Patent No.: US 9,429,271 B2
(45) Date of Patent: *Aug. 30, 2016

(54) SAFETY CIRCUIT ASSEMBLY FOR SWITCHING ON OR OFF A HAZARDOUS SYSTEM IN A FAILSAFE MANNER

(71) Applicant: Pilz GmbH & Co. KG, Ostfildern (DE)

(72) Inventors: Hans Schwenkel, Ostfildern (DE); Winfried Gruber, Ostfildern (DE)

(73) Assignee: PILZ GMBH & CO. KG, Ostfildern (DE)

( * ) Notice: Subject to any disclaimer, the term of this patent is extended or adjusted under 35 U.S.C. 154(b) by 50 days.

This patent is subject to a terminal disclaimer.

(21) Appl. No.: 14/039,531

(22) Filed: Sep. 27, 2013

(65) Prior Publication Data

US 2014/0028453 A1 Jan. 30, 2014

Related U.S. Application Data

(63) Continuation of application No. PCT/EP2012/055311, filed on Mar. 26, 2012.

(30) Foreign Application Priority Data

Mar. 30, 2011 (DE) .......................... 10 2011 016 137

(51) Int. Cl.
*G08B 1/00* (2006.01)
*F16P 3/00* (2006.01)
(Continued)

(52) U.S. Cl.
CPC . *F16P 3/00* (2013.01); *G05B 9/02* (2013.01); *H01H 47/005* (2013.01)

(58) Field of Classification Search
CPC .... G08B 25/009; G08B 17/06; H01H 33/32; H01H 75/04; H01C 7/12; H02H 9/04
USPC ........... 340/532; 361/118, 116; 307/112, 326
See application file for complete search history.

(56) References Cited

U.S. PATENT DOCUMENTS

2006/0077613 A1* 4/2006 Hornung .............. H01H 47/004
361/118
2007/0090694 A1* 4/2007 Pullmann ............. H01H 47/002
307/112

(Continued)

FOREIGN PATENT DOCUMENTS

DE 43 33 358 A1 4/1995
DE 44 12 653 A1 8/1996

(Continued)

OTHER PUBLICATIONS

ISA/EP; English language translation of International Preliminary Report on Patentability (Chapter 1); issued by WIPO Oct. 2, 2013; 10 pp.

(Continued)

*Primary Examiner* — Jack K Wang
(74) *Attorney, Agent, or Firm* — Harness, Dickey & Pierce, P.L.C.

(57) ABSTRACT

A safety circuit assembly for switching on or switching off a hazardous system in a failsafe manner has an evaluating device which is designed to produce a redundant switching signal. The evaluating device is connected to a signaling device via a first and a second line forming a pair of lines. The signaling device has an actuator which can be switched between a defined first state and at least one further state. The evaluating device produces a first defined pulse signal and transmits the first defined pulse signal to the signaling device using the pair of lines in a first direction. The signaling device produces a second defined pulse signal, which is a predefined replica of the first pulse signal, and transmits the second defined pulse signal to the evaluating device using the same pair of lines when the actuator is in the defined first state.

19 Claims, 5 Drawing Sheets

(51) Int. Cl.
*G05B 9/02* (2006.01)
*H01H 47/00* (2006.01)
*B23K 11/24* (2006.01)
*H01H 73/00* (2006.01)
*H01C 7/12* (2006.01)

(56) References Cited

U.S. PATENT DOCUMENTS

| | | | |
|---|---|---|---|
| 2008/0246344 A1* | 10/2008 | Pullmann | G01D 3/08 307/326 |
| 2009/0073628 A1* | 3/2009 | Nitsche | H01H 47/005 361/190 |
| 2013/0113304 A1 | 5/2013 | Pullmann et al. | |

FOREIGN PATENT DOCUMENTS

| DE | 195 10 332 A1 | 10/1996 |
|---|---|---|
| DE | 199 11 698 A1 | 9/2000 |
| DE | 100 23 199 A1 | 1/2001 |
| DE | 100 11 211 A1 | 9/2001 |
| DE | 102 16 226 A1 | 10/2003 |
| DE | 103 48 884 A1 | 5/2005 |
| DE | 10 2004 020 997 A1 | 11/2005 |
| DE | 10 2006 027 135 B3 | 9/2007 |
| DE | 10 2010 025 675 B3 | 11/2011 |

OTHER PUBLICATIONS

CEI IEC 61508-2, Functional safety of electrical/electronic/programmable electronic safety-related systems—Part 2: Requirements for electrical/electronic/programmable electronic safety-related systems, May 2000, 152 pp.
DIN EN 954-1, Safety-related parts of control systems, Part 1: General principles for design, Mar. 1997, 34 pp.
Operating instructions "Safe line inspection device PLID d1," Oct. 2010, 4 pp.
IO-Link specification in brief, 2008, 13 pp.
International Search Report for PCT/EP2012/055311, Jun. 29, 2012, 2 pp.

* cited by examiner

SAFETY CIRCUIT ASSEMBLY FOR SWITCHING ON OR OFF A HAZARDOUS SYSTEM IN A FAILSAFE MANNER

CROSS-REFERENCES TO RELATED APPLICATIONS

This application is a continuation of international patent application PCT/EP2012/055311, filed on Mar. 26, 2012 designating the U.S., which international patent application has been published in German language and claims priority from German patent application DE 10 2011 016 137.6, filed on Mar. 30, 2011. The entire contents of these priority applications are incorporated herein by reference.

BACKGROUND OF THE INVENTION

The present invention relates to a safety circuit assembly for switching on or off a hazardous system in a failsafe manner, and to an evaluating device and to a signaling device for such a safety circuit assembly.

A safety circuit assembly in terms of the present invention is a circuit arrangement having at least two components which interact for safeguarding the hazardous operation of a technical system, i.e. in order to especially avoid accidents which endanger the health or the life of persons in the area of the system. One component is an evaluating device which is sometimes termed as a safety relay or a safety controller. The evaluating device is typically designed for interrupting a power supply path to one or more actuators of the system such as contactors, magnetic valves or electromotive drives in a failsafe manner in order to bring the system into a non-hazardous state. In the case of large systems, this function of the evaluating device can be restricted to parts or areas of the system or various areas of a large system may be safeguarded separately by means of a number of evaluating devices. It is of importance that the evaluating devices guarantee a safe system state even when faults occur, for instance when electronic components fail, a wire connection is damaged or another fault event occurs. Therefore, the evaluating devices are typically constructed with multi-channel redundancy and they have integrated monitoring functions in order to detect potential faults and switch the system off in time, if necessary. Suitable evaluating devices can be programmable safety controllers in which the user can determine the individual control functions rather freely, but also simpler safety relays having a range of functions largely determined by the manufacturer. The evaluating devices are typically failsafe in terms of Category 3 or higher of European Standard EN 954-1, or failsafe in terms of SIL 2 of international Standard IEC 61508 or in terms of comparable requirements.

The evaluating device monitors the operating state of what is called signaling devices or sensors. The terms "signaling devices" and "sensors" are being used synonymously in the text which follows. A signaling device delivers input signals which are evaluated by the evaluating device and may be combined with other input signals from other signaling devices in order to switch the actuators of the system on or off in dependence thereon. In many cases, the signaling devices deliver quite simple binary information, for instance whether a protective mechanical door is closed or not, whether an emergency-off button is pressed or not, whether a light barrier is interrupted or not. In Moreover, signaling devices/sensors may deliver analog measurement values, for instance the temperature of a boiler or the rotational speed of a drive. The evaluating device of the safety circuit assembly usually releases the operation of the system only when a non-hazardous operation can be assumed from the signals from the signaling devices/sensors. However, there are also cases in which safeguarding measures are deliberately disabled, for example in order to set up a machine operation while the protective door is open. In these cases, a special enabling switch is frequently used which must be operated by the machine operator. Such an enabling switch is also a safety-related signaling device, the operation of which, however, as a rule, leads to the switching-on and not to the switching-off of the system.

In a large system, there can be a plurality of signaling devices/sensors which deliver safety-related input signals to the evaluating device. The individual signaling devices/sensors can be spatially distant from the evaluating device which leads to a high installation expenditure. In the case of line connections which extend outside of a switchgear cabinet closed during machine operation or outside of pinch-proof tubes, cross-connection shorts which may occur as a result of line damages must be detected by the evaluating device. Connecting lines between signaling devices/sensors and evaluating devices of a safety circuit assembly are therefore frequently multiple-redundant which further increases the installation expenditure.

DE 10 2004 020 997 A1 describes a safety circuit assembly in which a plurality of signaling devices are connected in series to a failsafe evaluating device. The evaluating device produces two enable signals which are fed through the series of signaling devices and back to the evaluating device by means of redundant lines. If a signaling device of the series interrupts at least one of the redundant enable signals, this is detected in the evaluating device and a power supply path to the system is interrupted. Clever implementation of the signaling devices also enables diagnostic information to be transmitted to the evaluating device by means of the safety lines. The known circuit assembly therefore provides for a relatively cost-effective configuration having flexible diagnostic capabilities. However, the practical implementation requires at least four separate wire lines in order to transmit the redundant enable signals from the evaluating device to the signaling devices and back again to the evaluating device. Since the signaling devices in DE 10 2004 020 997 A1 use electronic components, which require an operating voltage, two further wires are typically needed in order to supply the operating voltage and operating ground to the signaling devices. Such an implementation is therefore still expensive, in spite of the advantages already achieved, especially when large distances have to be bridged between individual signaling devices and the evaluating device. When controlling ski lifts, for instance, distances of several kilometers between a signaling device and the evaluating device may exist and it is desirable in such cases to use existing lines; as a rule, however, there are not enough line wires available for an implementation according to DE 10 2004 020 997 A1. But also in other production and/or conveyor systems, such as at airports or in large factories, there may be large distances between the signaling devices and an evaluating device.

DE 199 11 698 A1 discloses another safety circuit assembly having an evaluating device and a plurality of signaling devices which are connected in series to the evaluating device. Each signaling device has a normally-closed contact and is coupled to a code signal generator which, for diagnostic purposes, delivers a characteristic code signal to the evaluating device when the contact has been opened. The practical implementation needs at least three lines. A cross-connection short between the line at the enable signal output of the evaluating device and the line at the enable signal input of the evaluating device cannot be easily detected, however, so that redundant signal lines are needed for a higher safety category. If necessary, further lines for operating voltage and ground are also required.

DE 100 11 211 A1 discloses a further safety circuit assembly having signaling devices and a failsafe evaluating device. The signaling devices are connected to the evaluating device either via one connecting line in a single-channel manner or via two redundant connecting lines in two-channel manner. The single-channel connection per se does not offer failsafe protection and is only proposed for a starting key which is typically arranged close to the hazardous system. In one exemplary embodiment, it is described that two different clock signals are fed back from the failsafe evaluating device as enable signals via redundant contacts of an emergency-off button. In this case, at least four lines are needed. Here, again, further lines are typically required for supplying an operating voltage and/or ground to the signaling devices.

DE 102 16 226 A1 describes a safety circuit assembly having a number of signaling devices and evaluating devices, with two evaluating devices being connected to one another in series in order to form a control system having different shutdown groups. In exemplary embodiments, the evaluating devices are coupled via a single-channel connecting line via which a potential-related switching signal having a static signal component and a dynamic signal component is transmitted. The practical implementation still requires a common ground line for the connected evaluating devices. In addition, each evaluating device needs an operating voltage so that the actual number of lines for coupling the evaluating devices is higher than might be suggested from the term "single-channel connecting line".

From DE 103 48 884 A1, an emergency-off button having a control element is known which can be moved between a first and at least one second position. A detector element for detecting the position of the control element comprises a transponder having an individual transponder identification and a reading unit for the transponder identification. The emergency-off button has a signal input for supplying a test signal, with the aid of which the reading-out of the transponder identification can be suppressed for test purposes. In addition, connections are needed for supply voltage, ground and a signal output by which the emergency-off button can transmit the information of the detector element to a failsafe evaluating device. Thus, at least four lines are required for connecting the emergency-off button to a conventional evaluating device.

A further signaling device is known from DE 100 23 199 A1. In an idling position of the signaling device, a switching element is opened. In a particular operating position, the switching element is closed. Details for connecting the signaling device to a failsafe evaluating device are not disclosed.

The skilled persons also know a field bus system, called ASI (Actuator-Sensor Interface) bus, which can be implemented by means of a special two-wire cable and which is used for networking sensors and actuators at the field level of an automated system. An ASI bus master polls the sensors connected to the ASI bus. These respond with their respective sensor state to the ASI bus master. Although this system manages with two line wires, it requires special interface chips which are capable of implementing the special bus protocol. For a safety circuit assembly of the type described above, both the evaluating device and the signaling device must have an ASI bus-compatible interface chip and the special connection to the ASI bus cable which is too elaborate and expensive for many simple signaling devices.

From DE 43 33 358 A1, a non-safe circuit assembly is known in which both an operating voltage and a control signal are transmitted from an evaluating device to a magnetic valve, i.e. an actuator, by means of a two-wire connecting line.

SUMMARY OF THE INVENTION

Against this background, it is an object of the present invention to provide a safety circuit assembly which allows for a still more cost effective connection between a signaling device and an evaluating device. It is another object to provide a safety circuit assembly which allows an inexpensive but failsafe connection even when the signaling device and the evaluating device are spatially far apart from one another. It is yet another object to provide a signaling device and a evaluating device for a safety circuit assembly which are able to work with one another without an individual learning or teaching process.

According to a first aspect of the invention, there is provided a safety circuit assembly for switching on or switching off a hazardous system in a failsafe manner, the safety circuit assembly comprising an evaluating device designed to produce a redundant switching signal configured for switching on or off the hazardous system in a failsafe manner, and comprising a signaling device connected to the evaluating device via a single pair of lines having a first and a second line, wherein the signaling device has an actuator configured to be switched between a defined first state and a further state, wherein the evaluating device produces a first defined pulse signal having a number of first signal pulses and transmits the first defined pulse signal to the signaling device using said single pair of lines in a first direction, wherein the signaling device produces a second defined pulse signal having a number of second signal pulses and transmits the second defined pulse signal to the evaluating device using said single pair of lines in a second direction, and wherein the second pulse signal is a predefined replica of the first pulse signal.

According to another aspect, there is provided a signaling device configured for being connected to an evaluating device in order to form a safety circuit assembly for switching on or switching off a hazardous system in a failsafe manner, the signaling device comprising an actuator configured to be transferred between a defined first state and a further state, a pair of connecting terminals for connecting a first line and a second line, said first and second lines forming a single pair of lines, and at least one pulse generator designed for receiving a first defined pulse signal from the evaluating device via said single pair of lines, and for generating a second defined pulse signal in response to the first defined pulse signal, wherein the second pulse signal is a predefined replica of the first pulse signal, and wherein the at least one pulse generator transmits the second pulse signal to the evaluating device using said single pair of lines, when the actuator is in the defined first state.

According to yet another aspect, there is provided an evaluating device configured for being connected to signaling device in order to form a safety circuit assembly for switching on or switching off a hazardous system in a failsafe manner, the evaluating device comprising a first pair of connecting terminals for connecting a first and a second line which together form a pair of lines, at least two further connecting terminals for outputting a failsafe switching signal for shutting down the hazardous system, at least one evaluating circuit designed for generating a defined first pulse signal on said pair of lines, for receiving a defined second pulse signal via said pair of lines and for comparing the defined second pulse signal and the first defined pulse signal, wherein the evaluating circuit is further designed for generating the failsafe switching signal in dependence on whether or not the second pulse signal is a predefined replica of the first pulse signal.

Preferably, both the signaling device and the evaluating device each have a respective device housing for accommodating the function-determining components, with connecting terminals for connecting the pair of lines being arranged at the respective device housing.

The novel safety circuit assembly thus uses a pair of lines via which the signaling device is connected to the evaluating device. In some practical implementations, the pair of lines is a two-wire line in which the first and the second line are permanently connected to one another. However, the pair of lines can also consist of two separate single lines or be formed by two wires of a multi-wire cable. In all cases it is characteristic that the pulse signals alternate in time between the evaluating device and the signaling device and are exchanged via only two bidirectionally used lines.

In comparison with known safety circuit assemblies, the number of connecting lines between the evaluating device and the signaling device can thus be reduced to a minimum. In preferred exemplary embodiments, the novel signaling device is connected to the spatially remote evaluating device via precisely two lines. In these cases, the novel signaling device does not need any further connecting line to the evaluating device, especially no third line for a ground connection. In other exemplary embodiments, however, further connecting lines may be provided between the signaling device and the evaluating device, in addition to the two lines of the pair of lines, for example for supplying the signaling device with an operating voltage or for other reasons. In these cases, however, the novel safety circuit assembly also profits from the fact that the information-carrying signals are transmitted between the signaling device and the evaluating device via a bidirectionally utilized pair of lines in mutually opposite directions.

The novel safety circuit assembly uses a defined first pulse signal by means of which the evaluating device monitors the defined first state of the actuator in the signaling device. The first pulse signal is a non-steady-state (dynamic) signal, that is to say it changes within a defined time interval that is small in comparison with the time intervals within which the evaluating device repeatedly transmits the first pulse signal to the signaling device in order to detect a potential change in the actuator state. Thanks to the dynamic signal, the risk that a so-called stuck-at fault simulates a false actuator state to the evaluating device is extremely low.

The evaluating device generates the first pulse signal and expects from the signaling device a second pulse signal which is a predefined replica of the first pulse signal. The evaluating device thus generates an attitude of expectation which is met by the signaling device only when the actuator is in the defined first state and, additionally, there are no errors in the safety circuit assembly. A line break in the connecting lines or an operating error in the signaling device would lead to the signaling device not being able to meet the attitude of expectation defined by the evaluating device. The evaluating device then switches off the hazardous system or brings it into a safe state in other ways. Since the evaluating device predetermines the signal to be expected and expects the response of the signaling device within a defined time window which follows the transmission of the first pulse signal, there is little probability that another signal occurring in the technical system is wrongly interpreted as a valid signal from the signaling device.

In addition, the novel safety circuit assembly has the advantage that the signaling device can be implemented by means of a very simple, and thus cost effective circuit which is essentially designed for reproducing a first pulse signal received via the pair of lines and sending back as second pulse signal via precisely this pair of lines if the actuator is in its first defined state. The first and the second pulse signal are thus very similar with regard to the signal characteristics. In some exemplary embodiments, the first and the second pulse signal are almost identical. In other exemplary embodiments, the second pulse signal may differ from the first pulse signal, because, for instance, it may be inverted in comparison with the first pulse signal, it may have a different pulse length in comparison with the first pulse signal and/or it may have a defined number of pulses more or less. However, the differences between the first and the second pulse signal are such that the individual character and/or information coded in the first pulse signal are largely retained so that the evaluating device can detect the second pulse signal as a valid response to the first pulse signal without any individual learning process.

In some exemplary embodiments, the first pulse signal represents a bit sequence which is also contained at least predominantly in the second pulse signal. Individual bits can be added or omitted by the signaling device as long as the predominant part of the bit sequence sent by the evaluating device to the signaling device is sent back again to the evaluating device. Since the signaling device reproduces the first pulse signal, the novel safety circuit assembly does not need any learning process for configuring the evaluating device to the individual signaling device.

In some way, the novel safety circuit assembly imitates the signal loop used in the prior art safety circuit assemblies mentioned initially, by means of which an enable signal is fed from the evaluating device via the signaling device back to the evaluating device. In contrast to the known assemblies, however, the signaling device replicates the monitoring signal obtained from the evaluating device actively and it uses precisely the same pair of lines for the return path as for the forward path. This becomes possible due to the fact that the first and the second pulse signal are transmitted one after the other in time via the single pair of lines. Correspondingly, the evaluating device and the signaling device have a defined temporal behavior which specifies the time interval between the first and second pulse signal.

In contrast to other communication links having bidirectionally utilized lines, however, the novel safety circuit assembly can dispense with protocol measures such as, for example, a handshaking mechanism, since the signals transmitted between evaluating device and signaling device are essentially determined by the evaluating device and the signaling device only returns a pulse signal received from the evaluating device back to the evaluating device in reproduced form.

Overall, the novel safety circuit assembly provides a very simple and cost-effective connection between an evaluating device and a spatially remote signaling device having an actuator, the state of which must be monitored by the evaluating device in order to switch a hazardous system on or off in a failsafe manner in dependence thereon. As a rule, individual training of the signaling device for the evaluating device is not required since the signaling device essentially replicates the first pulse signal. The object mentioned above is therefore achieved completely.

In a preferred refinement of the invention, the first line transmits the first pulse signal whilst the second line carries a first reference potential, and the second line transmits the second pulse signal whilst the first line carries a second reference potential. Preferably, the respective reference potential is substantially static so that the signal pulses of the first and of the second pulse signal, respectively, essentially appear on one of the two lines whilst the other of the two lines carries a largely static potential. In preferred exemplary embodiments, the signal pulses of the pulse signals are voltage pulses which are present between the two lines, one of the lines in each case carrying a reference potential for the other one.

In this refinement, the two lines exchange their function in dependence on the direction of transmission of the first and second pulse signal, respectively. The first pulse signal appears essentially on the first line whereas the second line carries the reference potential. The information-carrying signal pulses are thus generated and transmitted essentially on the first line. By comparison, the information-carrying signal pulses of the second pulse signal are transmitted essentially on the second line. The first pulse signal coming from the evaluating device and the second pulse signal returning to the evaluating device are thus transmitted on different lines of the pair of lines.

This refinement provides for an even better detection of cross-connection shorts, that is to say of faulty signal injections on one or both lines due to a damaged or wrongly connected line. Due to the fact that the evaluating device emits the first pulse signal essentially on one of the two lines and expects it delayed in time on the other one of the two lines, the probability that the pulse signal emitted on the first line is wrongly detected as a returning second pulse signal is virtually eliminated. A particularly simple and also reliable implementation is further obtained when the two reference potentials are different from one another because a cross-connection short between the two lines can then already be detected by means of the reference potentials.

In a further refinement, the signaling device generates the second pulse signal only when the actuator is in the defined first state.

In this refinement, the signaling device remains "mute" when the actuator is not in the defined first state. As an alternative, it is possible in other refinement that the signaling device sends different pulse signals to the evaluating device in dependence on the state of the actuator. By comparison, the embodiment preferred here has the advantage that the signaling device can be implemented in a simpler and thus more cost-effective manner. In addition, the signaling device, in this embodiment, behaves largely in a manner compatible to conventional signal devices in which a signal loop is conducted from the evaluating device via the signaling device back to the evaluating device.

In a further refinement, the first pulse signal comprises a predefined identifier which unambiguously identifies the evaluating device. In some preferred exemplary embodiments, the predefined identifier is a unique serial number which is defined by the manufacturer of the evaluating device and stored permanently in the evaluating device.

Since the second pulse signal is a predefined replica of the first pulse signal, the second pulse signal also contains the predefined identifier. The refinement has the advantage that the evaluating device can identify "its" pulse signal by means of the unambiguous identifier. The risk that two evaluating devices of identical type which, for example, are mounted next to one another in a switchgear cabinet, wrongly interpret a pulse signal belonging to the other evaluating device as a valid second pulse signal is reduced even further. This refinement therefore provides for an even greater fault tolerance.

It is particularly advantageous if at least the first pulse signal essentially consists of the predefined identifier, i.e. if the first pulse signal does not have any further significant information-carrying signal components beyond the predefined identifier since the first pulse signal is short in this case and provides for a more rapid shutdown of a hazardous system in the case of a fault or in the case of an actuation of the actuator.

In a further refinement, the signaling device has an energy store which is charged up by the evaluating device via the first and the second line.

In this refinement, the novel signaling device manages without additional voltage supply lines since it obtains the energy needed for generating the second pulse signal from the evaluating device via the pair of lines. The refinement provides for a very advantageous implementation having precisely two connecting lines between the signaling device and evaluating device and without additional power supply at the signaling device. In some exemplary embodiments, the energy store of the signaling device is charged up exclusively via the signal pulses of the first pulse signal. In other exemplary embodiments, a special "charging cycle", in which the evaluating device charges up the energy store in the signaling device before or after transmitting the first pulse signal, can be provided as an alternative or in addition.

In a further refinement, the signaling device has a first channel and a second channel which monitor the first state of the actuator in a redundant manner.

In this refinement, the novel signaling device is implemented as a multi-channel device in spite of the reduced number of only two connecting lines. The signaling device, therefore, provides for a higher fault tolerance in the monitoring of the actuator.

In a further refinement, both the first and the second channel generate the second signal pulses.

In this refinement, both channels are involved in the generation of the second pulse signal so that the evaluating device obtains a response message from each of the redundant channels. In some exemplary embodiments, the two (or more) channels of the signaling device can generate the defined second pulse signal jointly, for instance in that the channels alternately generate the individual signal pulses of a second pulse signal. In other exemplary embodiments, the channels of the signaling device generate the defined second pulse signal alternately. In the case of a two-channel signaling device, each channel thus "responds" only with each second reception of the first pulse signal.

In a further refinement, the first channel and the second channel are connected to the two lines in parallel with one another.

This refinement provides for a very simple and cost-effective implementation in which the channels of the signaling device are substantially configured identically. The refinement is also advantageous if the redundant channels are intended to jointly generate the second pulse signal. As an alternative, it is possible that the first pulse signal contains channel selection information, for example in the form of an address bit by means of which the evaluating device can determine which of the redundant channels of the signaling device is to generate the second pulse signal. The variant mentioned last provides for an advantageous diagnosis capability in cases in which only one channel of the signaling device fails since the evaluating device can determine which channel of the signaling device is interrogated.

In a further refinement, the first channel and the second channel are connected to the two lines in antiparallel fashion with one another.

Although the two channels of the signaling device are connected in parallel to the lines in this refinement, they are so with different polarity. In consequence, the evaluating device can select by means of the polarity of the signals on the two connecting lines which one of the redundant channels of the signaling device is to generate the second pulse signal. This refinement, too, provides for an advantageous diagnosis in cases in which only one channel of the signaling device has a functional fault. In addition, the refinement has the advantage that the first pulse signal can be formed without address bit and in consequence to be shorter. A further advantage of this refinement consists in that the polarity of the connecting terminals is arbitrary at the evaluating device and the signaling device since it is altered in any case in the course of operation.

In a further refinement, the signaling device has at least one actuating switch which is opened or closed in dependence on the state of the actuator, and at least one pulse generator which generates the second pulse signal, wherein the at least one actuator switch is arranged between the pulse generator and the pair of lines.

In this refinement, the pulse generator which generates the second pulse signal is separated from the pair of lines by means of the actuator switch when the actuator is not in its first defined state. The refinement provides for a very simple and cost-effective implementation in which the signaling device can send the defined second pulse signal to the evaluating device only when the actuator is in its defined first state.

In a further refinement, the signaling device has at least one pulse generator which generates the second pulse signal, wherein the at least one pulse generator has a switch which is designed for short circuiting the first and the second line to one another. In this refinement, the evaluating device advantageously has a pull-up resistor by means of which the evaluating device can generate a defined high potential on one of the two lines whilst the signaling device generates the second pulse signal.

This refinement provides for a very simple and cost-effective implementation of the signaling device since the pulse generator only has to short circuit the potentials present on the two connecting lines in order to generate a signal pulse for the second pulse signal. In addition, the signaling device only needs little energy for sending the second pulse signal.

In a further refinement, the at least one pulse generator has a second switch which forms a push-pull stage with the first switch.

In this refinement, the pulse generator has at least two switches by means of which the "transmitting line" of the pair of lines can be alternately pulled to one of two different potentials. The embodiment provides for a higher transmission rate since the line is actively recharged with each signal pulse. The higher rate is advantageous for a rapid response of the safety circuit assembly in the case of an actuation of the actuator and/or in a fault situation.

In a further refinement, the evaluating device generates a first series of first pulse signals and the signaling device generates a second series of second pulse signals, wherein the first series forms a data word having a plurality of first digits, wherein the second series forms a data word having a plurality of second digits, and wherein the first and second digits are transmitted alternately via the pair of lines.

In this refinement, each pulse signal transports only a part of the overall information which is exchanged between the evaluating device and the signaling device. When the evaluating device transmits, for example, a serial number having n digits to the signaling device, the signaling device can send back a second pulse signal to the evaluating device after each individual digit so that the total serial number is only exchanged by means of the series of n first and second pulse signals. On the one hand, the refinement provides for a multi-digit individual identifier having a high degree of detailing, that is to say the probability that two evaluating devices of the same type use the same identifier is reduced even further. On the other hand, the novel safety circuit assembly can respond rapidly to any shut-down commands of the signaling device since the signaling device does not need to wait for receiving the entire identifier before it sends back the second pulse signal to the evaluating device. In addition, this embodiment leads to further dynamization of the signals between evaluating device and signaling device since the transmitted pulse signals differ at least partially from one another within the series. Any cross-connection shorts on the two connecting lines can therefore be eliminated even more reliably.

Naturally, the aforementioned features and those still to be explained in the text which follows can be used not only in the combination specified in each case but also in other combinations or by themselves without leaving the scope of the present invention.

BRIEF DESCRIPTION OF THE DRAWINGS

Exemplary embodiments of the invention are shown in the drawing and will be explained in greater detail in the following description. In the drawing.

DESCRIPTION OF PREFERRED EMBODIMENTS

Figure 1:
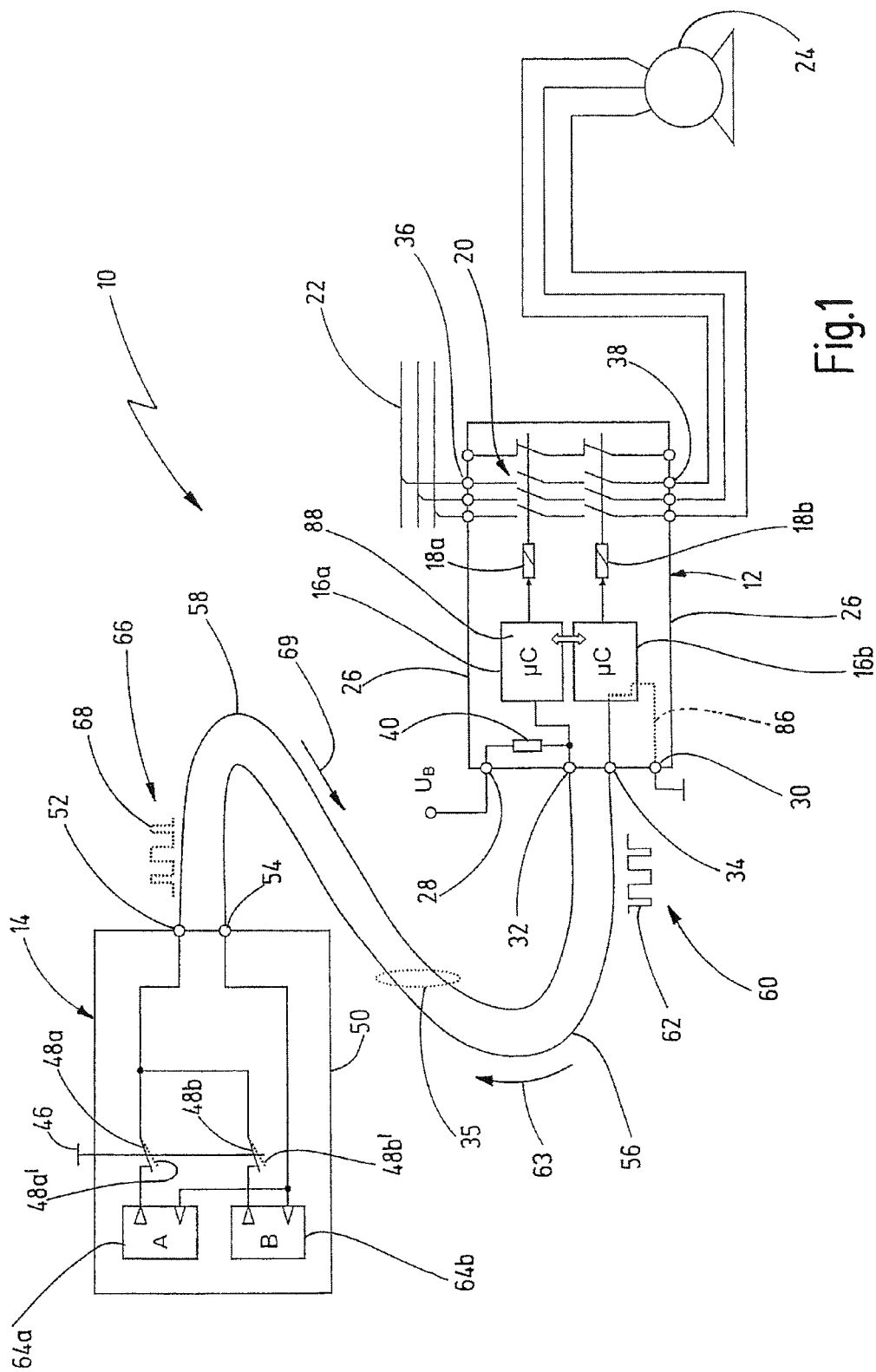
FIG. 1 shows a simplified representation of an exemplary embodiment of the novel safety circuit assembly.

In FIG. 1, an exemplary embodiment of the novel safety circuit assembly is designated by the reference number 10 in its totality. The safety circuit assembly 10 comprises an evaluating device 12 and a signaling device 14. In this exemplary embodiment, the evaluating device 12 is a safety relay having a largely specified range of functions. It is designed for processing input signals from signaling devices in order to switch on or off in dependence thereon an actuator such as, for example, a contactor, a magnetic valve or an electric drive. As an alternative to a safety relay, the evaluating device 12 could be a programmable safety controller.

The evaluating device 12 is of multi-channel redundancy and has test functions which are designed for detecting internal component failures and external faults in the connection with the signaling device 14 and in the signaling device itself in order to bring a monitored system into a safe state on occurrence of a fault. In the preferred exemplary embodiments, the evaluating device 12 is failsafe in terms of Category 3 or higher according to European Standard EN 954-1, in terms of SIL2 according to International Standard IEC 61508 or in terms of comparable requirements. Simplified, two redundant signal processing channels of the evaluating device 12 are shown here in the form of two microcontrollers 16a, 16b which in each case drive a switching element 18a, 18b and communicate with one another via a suitable interface in order to monitor one another. Instead of or in addition to microcontrollers, the evaluating device 12 could have microprocessors, ASICs, FPGAs or other redundant signal and data processing circuits.

The switching elements 18 are shown here as relays, the normally-open contacts of which are arranged in series with one another. The normally-open contacts form a power supply path 20 between a power supply 22 and an electric drive 24 which symbolizes here a machine installation. It goes without saying that the machine installation may have a plurality of electric drives and other actuators in real cases. The invention is also not restricted to machine installations in the sense of production machines. Instead, it can be used in all technical systems which pose a hazard in operation and which must be brought into a defined state in such a case, especially by interrupting a power supply path 20. Instead of or in addition to the relays 18, the evaluating device 12 can have electronic switching elements, particularly power transistors. In some exemplary embodiments, the evaluating device 12 has instead of the relays a number of redundant electronic switching elements which in each case provide a potential-related output signal by means of which external contactors, magnetic valves or the like can be driven.

In the preferred exemplary embodiments, the evaluating device 12 has a device housing 26 in which the individual components, especially the microcontrollers 16 and switching elements 18 are arranged. At the device housing, connecting terminals are arranged, some of which are designated here by reference numbers 28, 30, 32, 34, 36 and 38.

The connecting terminal 28 is here a connecting terminal for supplying an operating voltage $U_B$ for the evaluating device 12 which is needed especially for supplying the microcontrollers 16 (not shown here in detail). In some exemplary embodiments, the operating voltage $U_B$ is a 24-volt direct voltage. The connecting terminal 30 is a ground connection which acts as reference for the supply voltage $U_B$. Terminal 30 is in this case, therefore, the device ground of the evaluating device 12.

The connecting terminals 32 and 34 are connecting terminals for connecting a pair of lines, for instance a two-wire cable 35 via which the signaling device 14 is connected to the evaluating device 12. The evaluating device 12 can have further connecting terminals 32, 34 for connecting further pairs of lines. The connecting terminals 36 and 38 are designated, by way of example, for a plurality of connecting terminals which are used for connecting actuators. In this case, connecting terminal 36 is connected to one phase of the power supply 22. One phase of the drive 26 is connected to the connecting terminal 38.

According to a preferred exemplary embodiment, the evaluating device 12 here has a pull-up resistor 40 which connects the connecting terminal 32 to the operating voltage $U_B$ at the connecting terminal 28. As a rule, the potential at the connecting terminal 32 is "pulled up" to the potential of the operating voltage $U_B$ which is a particularly preferred implementation in conjunction with the signaling device explained in the text which follows. In some exemplary embodiments, the pull-up resistor 40 can be integrated in the connecting terminals 28, 30. In other exemplary embodiments, the pull-up resistor 40 can be arranged outside the evaluating device 12 or be lacking completely.

The signaling device 14 has an actuator 46 which is a manually operated push-button in the present case. The actuator 46 is here connected to two electric contacts 48a, 48b which are closed in the idle state and are opened when the key switch is operated (normally-closed contacts). The closed state of the normally-closed contacts 48a, 48b corresponds here to a defined first state in the sense of the present invention. This defined first state should be detected by the evaluating device 12 in order to close the switching elements 18a, 18b in dependence thereon. For example, the signaling device is an emergency-off push-button. The actuator 46 of the emergency-off button is not pressed in the normal case, and the drive 24 is allowed to run. If, however, the actuator 46 is pressed in an emergency situation, the drive must be stopped immediately. Furthermore, the drive 24 should not run or must be stopped if the evaluating device 12 is not able to unambiguously detect the safe (un-pressed) first state of the actuator, for instance because one of the contacts 48a, 48b is not completely closed and/or the pair of lines 35 is damaged.

In other exemplary embodiments, the signaling device 14 can be a protective-door switch, a position switch, a light barrier, a two-hand key switch, a start button or another signaling device, in dependence on the state of which a technical system is to be switched on or off in a failsafe manner. Instead of or additionally to the contacts 48a, 48b, the signaling device 14 can contain an optical, inductive, capacitive or other detector which signals at least one defined state of an actuator.

In the present case, the actuator 46 can be preloaded into the defined first state via a spring element (not shown). If the actuator 46 is pressed down against the force of the spring element, the actuator 46 opens the contacts 48a, 48b which is shown by way of example in FIG. 1 at reference numbers 48a', 48b'. An opened contact 48a', 48b' here represents a further state in terms of the present invention to which the evaluating device 12 may have to respond.

The signaling device 14 has a device housing 50 at which two connecting terminals 52, 54 are arranged. At the connecting terminals 52, 54, the pair of lines 35 is connected which leads to the spatially remote evaluating device 12. In some exemplary embodiments, the signaling device 14 has exactly two connecting terminals 52, 54 for connecting exactly two lines. In other exemplary embodiments, the signaling device 14 can have further connecting terminals (not shown here), for instance for supplying an operating voltage for the electronic components of the signaling device. Furthermore, the signaling device 14 can have further connecting terminals (not shown here) which provide for a cascading or series arrangement of signaling devices, only one signaling device of the series arrangement then being connected to the evaluating device 12.

The signaling device 14 is connected to the evaluating device 12 via the two lines 56, 58 of the two-wire cable 35. The first line 56 leads from the connecting terminal 54 of the signaling device to connecting terminal 34 of the evaluating device. The second line 58 leads from connecting terminal 52 of the signaling device to connecting terminal 32 of the evaluating device. In operation, the evaluating device 12 sends a defined first pulse signal 60 having a plurality of signal pulses 62 via line 56 to the signaling device 14 in a first direction 63. The pulse signal 60 is transmitted from connecting terminal 54 to two circuits 64a, 64b in the signaling device. The circuits 64a, 64b are designed for reproducing the received (first) pulse signal 60 and transmitting it as a second pulse signal 66 having a plurality of (second) signal pulses 68 to the evaluating device 12 in a second direction 69. In the preferred exemplary embodiments, the signal pulses 62, 68 are voltage pulses of a voltage which can be measured between the two lines 56, 58. In the preferred exemplary embodiments, the (second) line 58 carries a substantially steady-state reference potential whilst the signaling device 12 generates the signal pulses 62 of the first pulse signal 60 on the first line 56. Conversely, line 56 carries a substantially constant ground potential in the preferred exemplary embodiments whilst the signaling device 14 generates the reproduced pulse signal 66 on line 58 with the aid of circuits 64a, 64b.

As can be seen in the representation in FIG. 1, contact 48a is arranged between the signal output of circuit 64a and connecting terminal 52. Similarly, contact 48b is arranged between the signal output of circuit 64b and connecting terminal 52. Correspondingly, circuits 64 cannot generate the second pulse signal 66 on line 58 when contacts 48a, 48b are opened (reference number 48a', 48b'), that is to say when the actuator 46 is not in its first defined state. In consequence, the evaluating device 12 cannot receive the second pulse signal 66. In such a case, the evaluating device 12 will drive switching elements 18a, 18b in such a manner that the power supply path 20 to drive 24 is interrupted.

As is also indicated in FIG. 1, the first pulse signal 60 and the second pulse signal 66 do not need to be identical. It is sufficient if the second pulse signal 66 is a predefined replica of the first pulse signal 60, for instance in that the signal pulses 62, 68 coming from the device transmitting each are inverted with respect to one another. A difference between the two pulse signals 60, 66 can also result from the fact that the respective reference potential on the other line is different. Regardless of these and possible other differences, however, the signaling device 14 reproduces the first pulse signal 60 sent by the evaluating device 12 in a defined manner so that the evaluating device 12 receives an "echo" from the signaling device 14, provided the actuator 46 is in its defined first state.

In the text which follows, the generation of the reproduced second pulse signal 66 is explained by way of example by means of preferred exemplary embodiments of the signaling device 14. Identical reference symbols designate the same elements as previously in this context.

Figure 2:
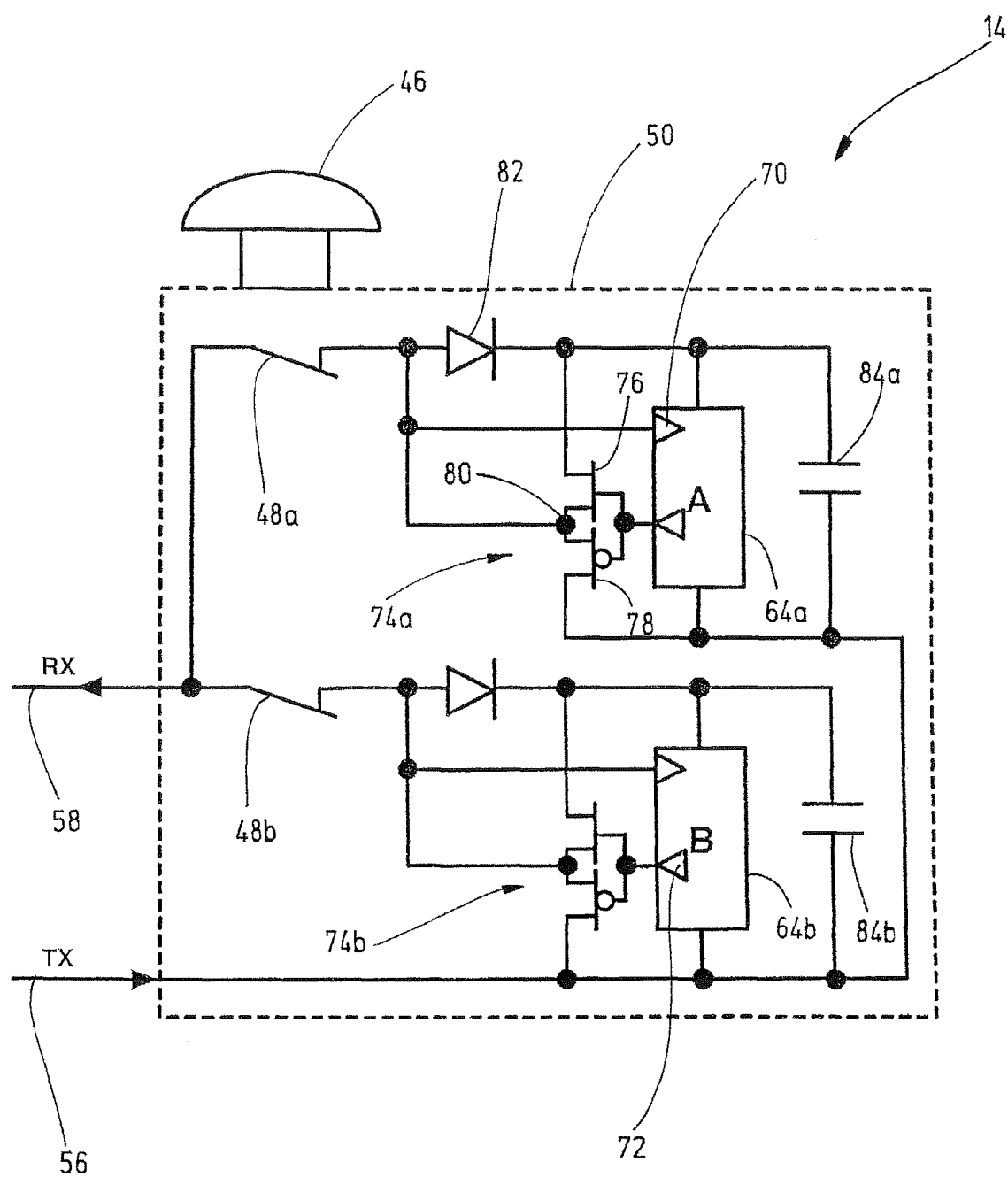
FIG. 2 shows a simplified representation of an exemplary embodiment of a signaling device for the safety circuit assembly from FIG. 1.

According to FIG. 2, the signaling device 14 has two circuits 64a, 64b which in each case operate as pulse generator. Each circuit 64a, 64b has a signal input 70 and a signal output 72. Signal inputs 70 of the two circuits 64a, 64b each are connected via one of the normally-closed contacts 48a, 48b to line 58. In FIG. 2, the latter is called RX (receive) line since the evaluating device 12 receives the signal pulses 68 of the reproduced second pulse signal 66 via line 58.

Signal output 72 of each circuit 64a, 64b in each case drives one switching element. In the exemplary embodiment shown, the switching element is a push-pull stage 74a, and 74b, respectively, which is formed by two transistors 76, 78. In the exemplary embodiment shown, transistors 76, 78 are field effect transistors. However, there can also be bipolar transistors or other switching elements. The gates (sources) of transistors 76, 78 are combined at a node which leads to the signal output 72 of the respective circuit 64a and 64b. Similarly, the drain terminals of the transistors 76, 78 are combined at a node 80. The node 80 is connected to line 58 via the respective normally-closed contacts 48a, 48b.

The source terminal of each transistor 76 is connected via a respective diode 82 (in reverse direction) and the respective normally-closed contact 48a, 48b to line 58. By comparison, the source terminal of the respective transistor 78 is connected directly to line 56.

Transistors 76, 78, as normal with a push-pull stage, operate in a complementary manner with respect to one another, that is to say transistor 76 conducts when transistor 78 is cut off, and conversely.

In parallel with the push-pull stage 74a, 74b, a respective capacitor 84a, 84b is arranged here. Capacitors 84a, 84b each form an energy store which can be charged via lines 56, 58 from the evaluating device 12. Correspondingly, capacitors 84a, 84b each provide an operating voltage for the associated circuit 64a, 64b.

The signaling device 14 from FIG. 2 then cooperates with the evaluating device 12 from FIG. 1 in the following way: when it is first taken into operation, the evaluating device 12 initially charges the energy store 84a, 84b in the signaling device 14 in that the evaluating device 12 applies the ground potential to line 56 as is shown in FIG. 1 at reference number 86. Since line 58 is pulled up to the potential of the operating voltage $U_B$ via the pull-up resistor 40, the operating voltage $U_B$ is present between lines 56, 58. Capacitors 84a, 84b are charged up to the operating voltage $U_B$. It shall be assumed by way of example that the operating voltage $U_B$=24 V. Correspondingly, capacitors 84a, 84b become charged up to 24 V in each case after a short charging period. This operating voltage is also available to circuits 64a, 64b when the evaluating device 12 changes the potentials on lines 56, 58.

After the initial first charging-up of capacitors 84a, 84b, the evaluating device 12 sends the first pulse signal 60 to the signaling device 14. In the exemplary embodiment shown here, the evaluating device 12 alternately generates high and low levels on line 56, a high level being, for example, 24 V, whilst a low level is 0 V. When the evaluating device 12 generates a low level (0 V) on line 56, a potential difference of 24 V exists between lines 56, 58 since the second line 58 is pulled up to the potential of the operating voltage $U_B$ via the pull-up resistor 40. Circuits 64a, 64b, therefore, "see" a high level at their respective signal input 70.

When the evaluating device 12 applies a high level (24 V) to line 56, the potential difference between the lines 56, 58 is 0 V. Circuits 64a, 64b "see" a low level at their respective signal input 70. Regardless of this, the operating voltage is maintained for circuits 64a, 64b since the capacitors 84a, 84b cannot follow the change of potential on line 56 on account of diode 82. By virtue of the evaluating device 12 applying a predefined pattern with high and low levels to line 56, the evaluating device 12 generates the first pulse signal 60 on line 56. Circuits 64a, 64b in the signaling device 14 read in the first pulse signal 60 at their respective signal inputs 70. As soon as the first pulse signal 60 has been transmitted completely from the evaluating device 12 to the signaling device 14, the signaling device 14 responds by sending the reproduced pulse signal 66 back to the evaluating device 12, unless contacts 48a, 48b are not closed.

In one exemplary embodiment circuits 64a, 64b generate the second pulse signal 66 alternately with respect to one another, that is to say circuit 64a first generates the second pulse signal 66 alone. The second circuit 64b then generates the second pulse signal 66 also alone in the next communication cycle. Subsequently, the first circuit 64*a* again generates the second pulse signal in each case in response to a first pulse signal 60 from the evaluating device 12. In other exemplary embodiments, the circuits 64*a*, 64*b* can generate the second pulse signal 66 jointly by generating the individual signal pulses 68 of the pulse signal 66 alternatively or in accordance with another predefined pattern.

In one exemplary embodiment, the evaluating device 12 can select by means of an address bit contained in the first pulse signal 60 which of the two circuits 64*a*, 64*b* is to generate the second pulse signal 66. In this case, the evaluating device 12 can address the two channels of the signaling device 14 selectively in order to be able to determine, for example in the case of a malfunction (inconsistent second pulse signals from the first and second circuits 64*a*, 64*b*), which one of contacts 48*a*, 48*b* is opened or closed. To generate the signal pulses 68 of the second pulse signal 66, the respective circuit 64*a*, 64*b* controls the push-pull stage 74*a*, 74*b* in such a manner that line 58 is connected either to the high potential of the operating voltage at capacitor 84*a*, 84*b* via transistor 76 or to the low potential on line 56. The evaluating device 12, for receiving the second pulse signal 60, advantageously applies the ground potential (reference number 86 in FIG. 1) again to line 56 whilst the signaling device 14 generates the signal pulses 68 for the second pulse signal 66. Every time when transistor 78 conducts, lines 56, 58 are short circuited to one another. In this case, the evaluating device 12 "sees" a Low potential on receiving line 58. If, in contrast, when transistor 76 in signaling device 14 conducts, the evaluating device 12 "sees" a High potential on line 58.

As can be seen from the above explanation, in each case one of lines 56, 58 carries the signal pulses 62, 68 in the preferred exemplary embodiment whilst the other line provides a largely steady-state reference potential. When the evaluating device 12 generates the first pulse signal 60, the reference potential on line 58 is the operating voltage $U_B$. In contrast, the reference potential on line 56 is the ground potential when the signaling device 14 generates the signal pulses 68 of the second pulse signal 66. Due to the fact that in each case one of the two lines 56, 58 carries a static reference potential whilst the other line has defined potential changes, and due to the fact that the signal pulses 62 of the first pulse signal 60 and the signal pulses 68 of the second pulse signal 66 are transmitted on different lines, the preferred exemplary embodiment provides for a high probability of detection with respect to any cross-connection shorts of lines 56, 58 to external potentials. The detection of cross-connection shorts is particularly high if the first pulse signal 60 and the reproduced second pulse signal 66 contain an individual identifier, for example in the form of a serial number 88 which is stored in the evaluating device 12. In this case, two evaluating devices 12 of identical type generate mutually different first pulse signals 60, and only the signaling device 14 connected to the respective evaluating device 12 can generate the "correct" pulse signal 66 which corresponds to that expected in the transmitting evaluating device 12. On the other hand, each connected signaling device 14 can generate the "correct" second pulse signal 66 since the pulse signal 66 is only a replica of the pulse signal 60 received by the evaluating device 12. An individual "pairing" between signaling device 14 and evaluating device 12 before the safety circuit assembly 10 is taken into operation is therefore not required.

Figure 3:
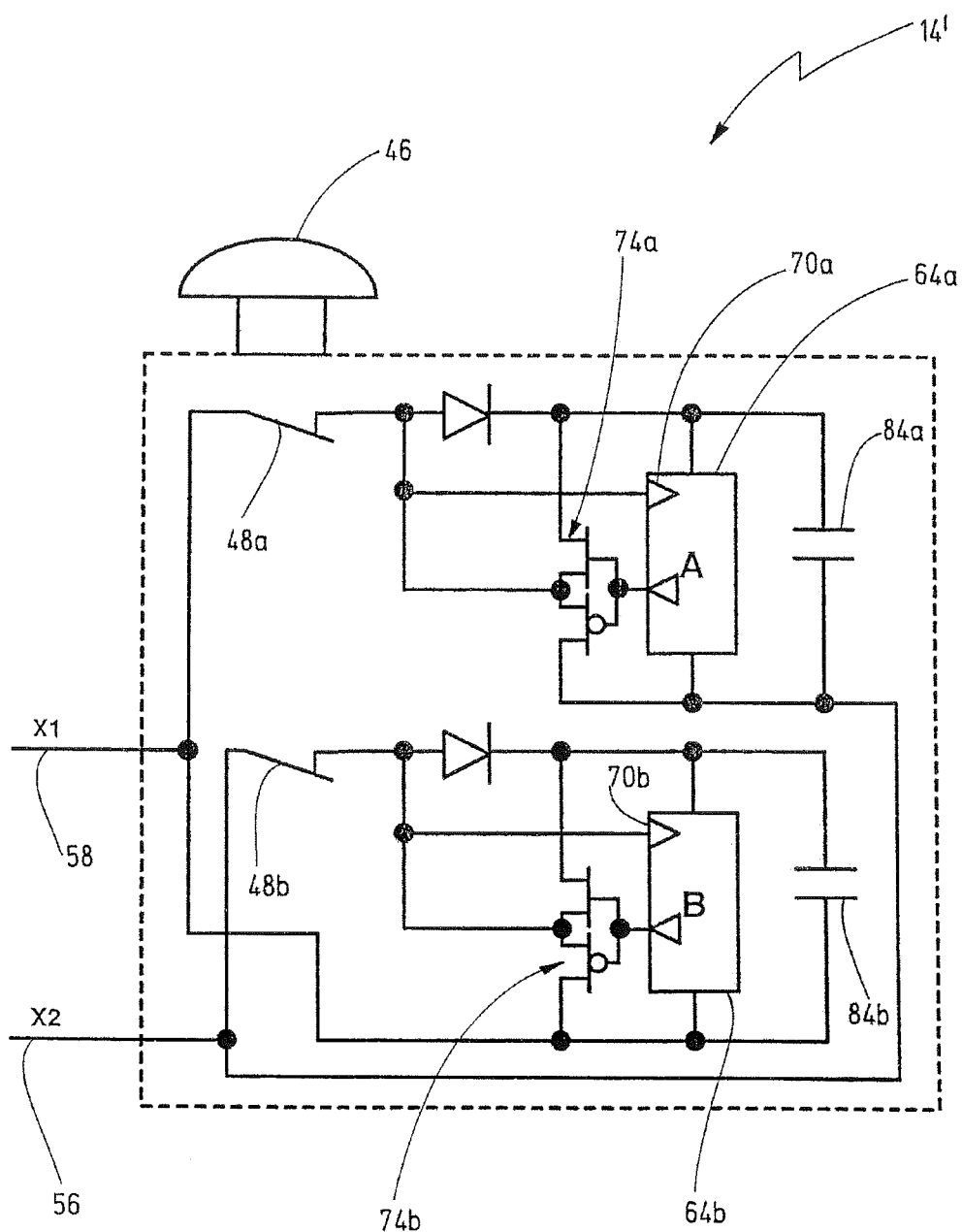
FIG. 3 shows a simplified representation of a further exemplary embodiment of a novel signaling device.

FIG. 3 shows a further exemplary embodiment of a preferred signaling device which, in distinction from the previous exemplary embodiment, is now designated by reference number 14'. For the rest, identical reference symbols again designate the same elements as before.

The signaling device 14' differs from the signaling device 14 in that circuits 64*a*, 64*b* and the respective associated components are connected in antiparallel fashion to the two lines 56, 58. For example, signal input 70*a* of circuit 64*a* is connected to line 58 via the normally-closed contact 48*a* while signal input 70*b* of circuit 74*b* is connected to line 56 via the normally-closed contact 48*b*. Correspondingly, the previously described function of lines 56, 58 also changes in dependence on whether circuit 64*a* or circuit 64*b* is to receive a first pulse signal from the evaluating device 12 and, in dependence thereon, is to generate a second pulse signal 66. On the other hand, the evaluating device 12 can select which one of circuits 64*a*, 64*b* is to generate the second pulse signal 66 by means of the respective polarity on lines 56, 58.

In addition, the signaling device 14' has the advantage that lines 56, 58 can be connected exchanged to the corresponding connecting terminals 52, 54, that is to say a polarity reversal is impossible.

In some exemplary embodiments of signaling devices 14, 14', circuits 64*a*, 64*b* are designed in such a manner that they deactivate their respective signal output 72 after they have generated a second pulse signal 66 so that a new sending process is possible only after a new reception of a first pulse signal 60 from the evaluating device 12.

Furthermore, circuits 64*a*, 64*b* can be designed in such a manner that they can be deactivated by the evaluating device 12 in each case by recharging capacitors 64*a*, 64*b*. Circuits 64*a*, 64*b* are advantageously identical in the signaling device 14'. In the signaling device 14 from FIG. 2, the circuits 64*a*, 64*b*, by comparison, respond differently to the address bit in the first pulse signal 60, that is to say circuits 64*a*, 64*b* are not identical in this case.

Figure 4:
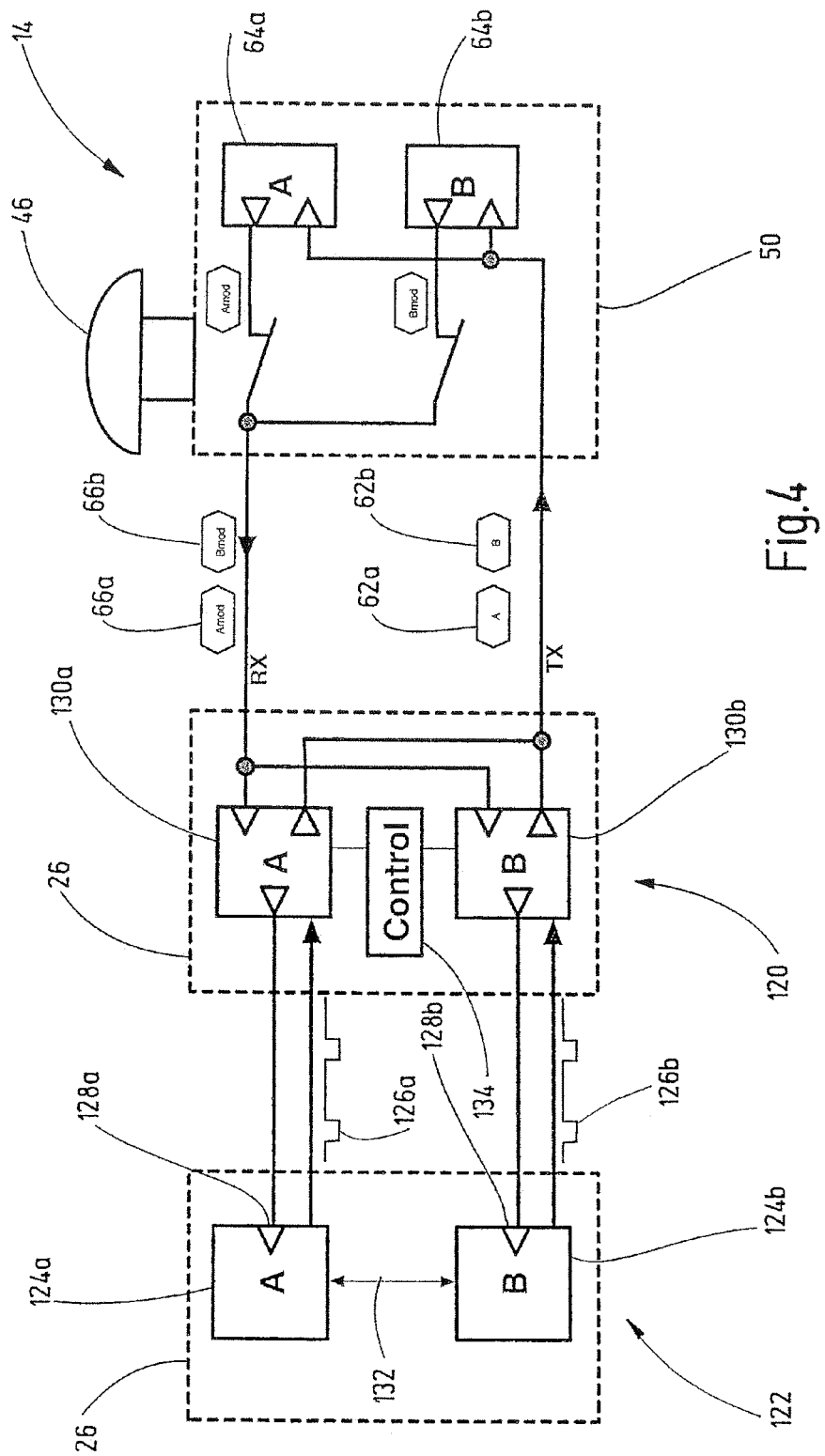
FIG. 4 shows a simplified representation of a further exemplary embodiment of the novel safety circuit assembly and FIG. 5 shows a simplified representation of a communication between the signaling device and the evaluating device of the novel safety circuit assembly in a further exemplary embodiment.

FIG. 4 shows a further exemplary embodiment of a safety circuit assembly comprising a signaling device 14 and an evaluating device 120. Identical reference symbols again designate the same elements as before.

In the exemplary embodiment according to FIG. 4, the evaluating device 120 is a type of adapter device which is placed between a conventional safety switching device 122 and the novel signaling device 14 in order to operate the novel signaling device 14 on a conventional safety switching device 122. For example, the safety switching device 122 is the same safety switching device which is used in the safety circuit assembly in DE 10 2004 020 997 A1 initially mentioned. This document is incorporated here by reference with respect to the details of the safety switching device 120. In addition, the safety switching device 122 can be any other conventional safety switching device which has at least two redundant inputs in order to accommodate two redundant input signals. Instead of a safety switching device 122, a conventional safety controller could also be connected to the novel signaling device 14 via the adapter device 120. The safety controller, too, only needs two redundant inputs for accommodating two redundant input signals.

For the sake of simplicity, the safety switching device 122 is shown here only symbolically with two signal processing channels 124*a*, 124*b*. The outputs via which actuators of a hazardous system can be switched on or off are not shown.

The safety switching device 122 generates a first and a second enable signal 126*a*, 126*b*. The enable signals 126*a*, 126*b* can be two static signals which, for example, have a high level in the active state and a low level in the passive state. Preferably, however, the enable signals 126*a*, 126*b* are two dynamic signals, especially two clock signals which are used in conventional safety switching devices or safety controllers for monitoring a conventional emergency-off key, protective-door switch or similar signaling device (compare in this respect also the aforementioned DE 10 2004 020 997 A1). The output signals 126a, 126b are thus typical non-individualized enable signals provided by a safety switching device 122 for monitoring a two-channel signaling device.

The safety switching device 122 expects at two inputs 128a, 128b two input signals which correspond exactly to the enable signals 126a, 126b. In the conventional signaling device having contacts, the enable signals 126a, 126b are looped back to inputs 128a, 128b of the safety switching device 122 via the redundant contacts of the signaling device. This loop is then implemented or imitated by the evaluating device 120 in that it sends the first enable signal 126a via a first evaluating circuit 130 back to the first input 128a of the safety switching device 122 whilst it sends the second enable signal 126b back to the second input 128b via a second evaluating circuit 130b. However, the prerequisite is that the evaluating device 120 has detected the defined first state of the actuator 46 in the signaling device 14 faultlessly in the manner described above. Correspondingly, the evaluating device 120 repeatedly sends first pulse signals 62a, 62b to the signaling device 14 and correspondingly expects reproduced second pulse signals 66a, 66b which are generated by circuits 64a, 64b in the signaling device 14. For the representation in FIG. 4, it is assumed that the evaluating device 120 generates two different first pulse signals 62a, 62b in order to address the redundant channels of the signaling device 14 selectively.

In one exemplary embodiment, the first pulse signals only differ by one address bit which is 0 for one channel and 1 for the other channel. Correspondingly, the reproduced second pulse signals can also differ with respect to the one address bit. However, it is also possible that the evaluating device 120 addresses the redundant channels of the signaling device 14 by alternating polarities as has been explained above by means of FIG. 3. Furthermore, the evaluating device 120 can also monitor the signaling device 14 without selective channel choice, in principle, for instance in that the signaling device 14 generates the reproduced second pulse signal with the aid of the two circuits 64a, 64b.

In some exemplary embodiments, the second pulse signals sent by the signaling device 14 are only validated in the safety switching device 122. In this case, the evaluating circuit 130a sends the enable signal 126a always to input 128a as long as it receives the expected second pulse signal 66a from the signaling device 14 for "its" first pulse signal 62a. The same applies to the second evaluating circuit 130b. In this case, the evaluating circuits 130a, 130b therefore do not "worry" about the pulse signals of the respective other evaluating circuit 130b, 130a. It is only in the safety switching device 122 that the two channels of the signaling device 14 are monitored by means of the enable signals sent back whether they deliver consistent results. For this purpose, the signal processing channels 124a, 124b compare their respective results in a manner known per se which is indicated diagrammatically by an arrow 132. A control circuit 134 in the evaluating device 120 is only used for synchronizing the evaluating circuits 130a, 130b in time.

As an alternative, it is possible in other exemplary embodiments that the evaluating device 120 already handles the validation of the signals from the signaling device 114 in that the evaluating circuits 130a, 130b compare their respective monitoring results with one another. The alternative mentioned first, however, provides for a simpler and thus more cost-effective implementation of the evaluating device 120 in the form of an adapter device.

Figure 5:
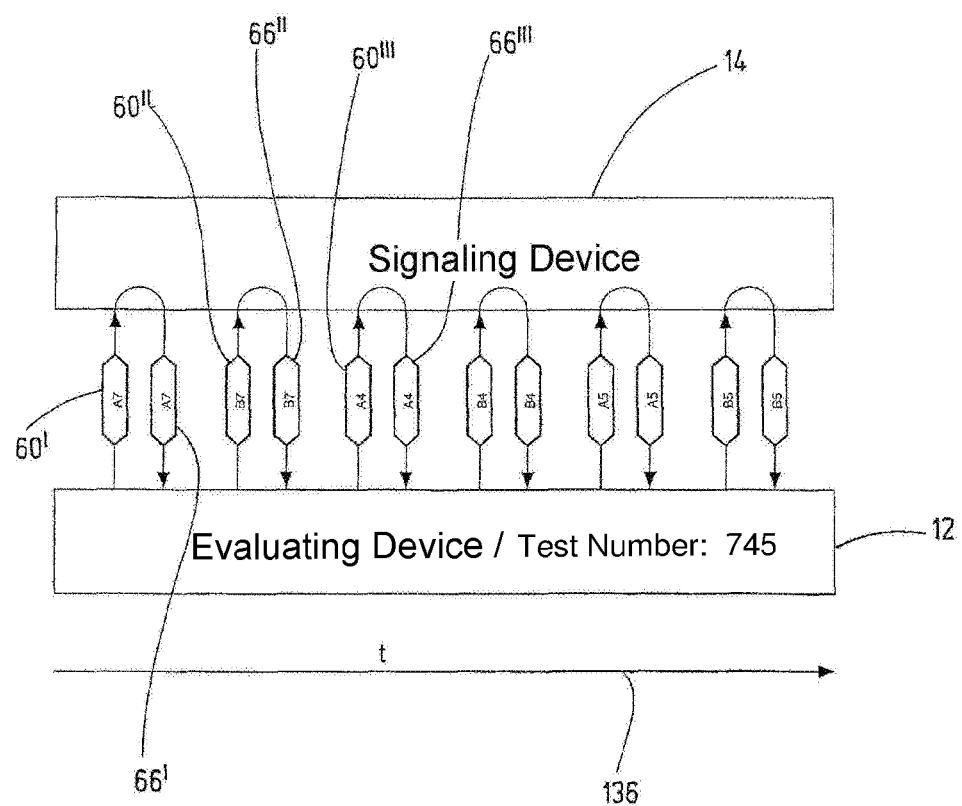

FIG. 5 shows by means of a greatly simplified representation a further variant which can be applied in conjunction with all exemplary embodiments described before. It shows a time axis 136 and the sequence in time in which first and second pulse signals are generated by the evaluating device 12 and signaling device 14.

In the preferred exemplary embodiments, the evaluating device generates a first series of first pulse signals, some of which are designated here by the reference numbers 60', 60", 60'". The signaling device 14 generates a corresponding second series of second pulse signals 66', 66", 66'". Every second pulse signal 66 is a defined replica of the first pulse signal 60 previously sent. In addition, the first series of first pulse signals forms a data word having a plurality of digits.

It shall be assumed by way of example that the data word is the test number 745. The individual digits or numbers of the test number are then transmitted successively from the evaluating device to the signaling device and sent back by the signaling device. In addition, the two channels also alternate, that is to say the first channel (in this case channel A) first sends the first digit of the test number (number 7 in this case) with the aid of a first pulse signal A7 to the signaling device. The first channel in the signaling device (also designated as channel A in this case) reproduces the first pulse signal and generates the second pulse signal (reference number 66'). Subsequently, pulse signals 60", 66" are exchanged in which the first number "7" of the test number is again coded, the data now being exchanged via the second channels (channel B). Following this, the first channels again communicate, the evaluating device sending the next digit/number of the test number to the signaling device and the signaling device reproducing the corresponding information. In this manner, a data word having a plurality of digits is exchanged "digit by digit" in the form of first and second pulse signals between the evaluating device and the signaling device. This variant enables very long test numbers to be exchanged between the evaluating device and the signaling device, the signaling device responding to the evaluating device within very short time intervals, nevertheless.

In some exemplary embodiments, the individual serial number of the evaluating device is used as test number, wherein this serial number can contain eight digits, ten digits or even more digits. After one cycle, at the latest, in which all digits of the data word have been exchanged between the evaluating device and the signaling device, the evaluating device can check whether it receives the correct identifier completely from the signaling device. On the other hand, the evaluating device can respond very rapidly to any actuation of the actuator in the signaling device or to a line break since the expected second pulse signal (containing the one currently sent digit of the multi-digit test number) fails to appear.

What is claimed is:

1. A safety circuit assembly for switching on or switching off a hazardous system in a failsafe manner, the safety circuit assembly comprising:
   an evaluating device for producing a redundant switching signal configured for switching on or off the hazardous system in a failsafe manner, and
   a signaling device connected to the evaluating device via only a single pair of lines having a first and a second line, wherein the signaling device has an actuator configured to be switched between a defined first state and a second state, wherein the evaluating device produces a first defined pulse signal having a number of first signal pulses and transmits the first defined pulse signal to the signaling device using said single pair of lines in a first direction, wherein the signaling device produces a second defined pulse signal having a number of second signal pulses and transmits the second defined pulse signal to the evaluating device using said single pair of lines in a second direction, and wherein the second pulse signal is a predefined replica of the first pulse signal.

2. The safety circuit assembly of claim 1, wherein the first and the second pulse signals are repeatedly transmitted one after the other via said single pair of lines.

3. The safety circuit assembly of claim 1, wherein the first line transmits the first pulse signal whilst the second line carries a first reference potential, and the second line transmits the second pulse signal whilst the first line carries a second reference potential different from said first reference potential.

4. The safety circuit assembly of claim 1, wherein the signaling device generates the second pulse signal only when the actuator is in the defined first state.

5. The safety circuit assembly of claim 1, wherein the first pulse signal comprises a predefined identifier which identifies the evaluating device.

6. The safety circuit assembly of claim 1, wherein the signaling device has an energy store which is charged up by the evaluating device via said first and the second line.

7. The safety circuit assembly of claim 1, wherein the signaling device has a first channel and a second channel which together monitor the first state of the actuator in a redundant manner.

8. The safety circuit assembly of claim 7, wherein both the first and the second channel generate the second signal pulses.

9. The safety circuit assembly of claim 7, wherein the first channel and the second channel are connected to the two lines in parallel with one another.

10. The safety circuit assembly of claim 7, wherein the first channel and the second channel are connected to the two lines in antiparallel fashion with one another.

11. The safety circuit assembly of claim 1, wherein the signaling device has at least one actuator switch which is opened or closed as a function of the actuator, and at least one pulse generator which generates the second pulse signal, wherein the at least one actuator switch is arranged between the pulse generator and said single pair of lines.

12. The safety circuit assembly of claim 1, wherein the signaling device has at least one pulse generator which generates the second pulse signal, wherein the at least one pulse generator has a first switch designed for short circuiting the first and the second line to one another.

13. The safety circuit assembly of claim 12, wherein the at least one pulse generator has a second switch which forms a push-pull stage together with the first switch.

14. The safety circuit assembly of claim 1, wherein the evaluating device generates a first series of first pulse signals and the signaling device generates a second series of second pulse signals, with the first series forming a first data word having a plurality of first digits, with the second series forming a second data word having a plurality of second digits, and with the first and second digits being transmitted one after the other via the pair of lines.

15. A signaling device configured for connection to an evaluating device in order to form a safety circuit assembly for switching on or switching off a hazardous system in a failsafe manner, the signaling device comprising:

an actuator configured to be transferred between a defined first state and a second state, a pair of connecting terminals for connecting a first line and a second line, said first and second lines forming a single pair of lines, and at least one pulse generator designed for receiving a first defined pulse signal from the evaluating device via said single pair of lines, and for generating a second defined pulse signal in response to the first defined pulse signal, wherein the second pulse signal is a predefined replica of the first pulse signal, and wherein the at least one pulse generator transmits the second pulse signal to the evaluating device using said single pair of lines, only when the actuator is in the defined first state.

16. An evaluating device configured for connection to a signaling device in order to form a safety circuit assembly for switching on or switching off a hazardous system in a failsafe manner, the evaluating device comprising:

a first pair of connecting terminals for connecting a first and a second line which together form a pair of lines, at least two further connecting terminals for outputting a failsafe switching signal for shutting down the hazardous system, and at least one evaluating circuit for generating a defined first pulse signal on said pair of lines, for receiving a defined second pulse signal from the signaling device via said pair of lines, and for comparing the defined second pulse signal and the defined first pulse signal, wherein the evaluating circuit is further configured to generate the failsafe switching signal in dependence on whether or not the defined second pulse signal is a predefined replica of the defined first pulse signal.

17. The evaluating device of claim 16, wherein the evaluating device is configured so that the pair of lines is the only connection between the evaluating device and the signaling device.

18. The signaling device of claim 15, wherein the signaling device is configured so that the single pair of lines is the only connection between the signaling device and the evaluating device.

19. The safety circuit assembly of claim 3, wherein said first and second defined pulse signals comprise digital pulse signals that switch between said first and second reference potentials.

* * * * *